United States Patent [19]

Levy

[11] Patent Number: 5,192,571

[45] Date of Patent: *Mar. 9, 1993

[54] PROCESSES FOR EFFECTING THE DECHLORINATION OF TAP WATER ADDED TO BEVERAGES

[76] Inventor: Ehud Levy, 1033 Chestnut Hill Cir., Marietta, Ga. 30064

[*] Notice: The portion of the term of this patent subsequent to Mar. 17, 2009 has been disclaimed.

[21] Appl. No.: 832,031

[22] Filed: Feb. 6, 1992

Related U.S. Application Data

[63] Continuation-in-part of Ser. No. 606,307, Oct. 31, 1990, Pat. No. 5,096,721.

[51] Int. Cl.$^5$ .................. A23F 3/18; A23F 5/26
[52] U.S. Cl. .................. 426/433; 426/78; 426/435; 426/594; 426/597; 426/85; 426/86; 426/134
[58] Field of Search .................. 426/66, 78, 433, 435, 426/594, 595, 597, 590, 422, 424; 210/506, 507, 508, 509, 501, 902, 915, 282, 757, 758, 754, 756

[56] References Cited

U.S. PATENT DOCUMENTS

| | | |
|---|---|---|
| 2,531,594 | 11/1950 | Abrahams . |
| 2,671,026 | 3/1954 | Hirschhorn . |
| 2,801,736 | 8/1957 | Grow . |
| 3,026,208 | 3/1962 | Gyorgyi .................. 426/66 |
| 3,174,889 | 3/1965 | Anderson et al. . |
| 3,202,275 | 8/1965 | Loughary . |
| 3,252,803 | 5/1966 | Belasco . |
| 3,260,674 | 7/1966 | Ross . |
| 3,386,834 | 6/1968 | Noiset . |
| 3,526,316 | 9/1970 | Kalogris . |
| 3,556,803 | 1/1971 | Ehrreich et al. . |
| 3,702,820 | 11/1972 | Hough . |
| 3,889,000 | 6/1975 | Conte et al. . |
| 3,915,296 | 10/1975 | Spencer . |
| 3,971,852 | 7/1976 | Brenner et al. . |
| 4,295,985 | 10/1981 | Petrow et al. . |
| 4,312,889 | 1/1982 | Meisheimer . |
| 4,364,835 | 12/1982 | Cheh .................. 210/757 |
| 4,666,610 | 5/1987 | Kuhns .................. 210/754 |
| 4,816,177 | 3/1989 | Nelson et al. . |
| 4,908,215 | 3/1990 | Perlman . |
| 4,937,004 | 6/1990 | Mandrin et al. . |
| 5,096,721 | 3/1992 | Levy .................. 426/590 |

FOREIGN PATENT DOCUMENTS

| | | | |
|---|---|---|---|
| 766309 | 10/1971 | Belgium .................. | 426/78 |
| 485722 | 5/1938 | United Kingdom .................. | 426/66 |
| 2074532 | 11/1981 | United Kingdom .................. | 426/78 |
| 2094992 | 9/1982 | United Kingdom . | |

OTHER PUBLICATIONS

Betz Handbook of Industrial Water Conditioning 7th Ed, 1976, pp. 24–29.
Manufacture & Analysis of Carbonated Beverages, Chem. Publ. Co. 1959, Jacobs pp. 89–109.
Coffee Technology, Avi Publ., Sivetz et al, 1979, pp. 680–684.
Research Disclosure, Nov. 1979, Apr. 26, 1966, p. 630.

*Primary Examiner*—Steven Weinstein
*Attorney, Agent, or Firm*—Penrose Lucas Albright

[57] ABSTRACT

Thiosulfate in anhydrous form is added in minute quantities to beverages such as soft drinks, coffee and tea, or food mixes wherein tap water is added in quantities not greater than about two quarts and preferably not greater than about one quart, to neutralize or destroy chlorines or chloramines in the water, such neutralization or destruction taking place almost instantaneously and, in any event, in a length of time not greater than about twenty seconds or, for most beverages, not greater than about three seconds, depending upon the pH of the beverage or food. The thiosulfate may be added directly to the beverage or to the water by metering apparatus or may have been previously applied in metered quantities to filters for the beverages including tea bags or may be mixed with syrup, powder mix, instant coffees or teas, coffee grounds or tea leaves, or may be encapsulated with a food grade material which is readily dissolvable in water. Because of the rapid reaction of the thiosulfate with the chlorines and the chloramines, the neutralization or destruction of same is essentially complete before a person commences to consume the food or beverage. The thiosulfate may be applied in pellet form to beverages or applied to articles which are inserted into beverages or food or which receive same such as filters, tea bags, cups, stirrers, straws, and the like.

13 Claims, No Drawings

PROCESSES FOR EFFECTING THE DECHLORINATION OF TAP WATER ADDED TO BEVERAGES

RELATED APPLICATION

This application is a continuation-in-part of application Ser. No. 07/606,307, filed Oct. 31, 1990, which issued as U.S. Pat. No. 5,096,721, on Mar. 17, 1992.

FIELD OF THE INVENTION

This invention relates to a method and materials for removing chlorine and chloramines from chlorinated water as or before it is mixed with other substances to constitute a beverage or food which is intended to be consumed almost immediately following its preparation, whereby the dechlorination is completed before the beverage or food is consumed. More particularly, it relates to the destruction of the products of hypochlorite used to disinfect tap water by metering small amounts of thiosulfate therein when or before that water is added to other substances to produce beverages or food, by the rapid autocatalytic reaction of thiosulfate with such products, the metering being accomplished by metering apparatus or by being applied to materials that receive the tap water such as coffee or tea filters, stirrers, straws and containers, whereby the dechlorination is complete before consumption of the beverage or food is commenced.

BACKGROUND OF THE INVENTION

Chlorine is often present in water from municipal sources as a result of disinfection processes. Chlorine (including chloramine) levels in municipal water supplies range up to about 3 ppm. These chlorines and chloramines, together with other substances which may be dissolved or present in municipal water supplies, affect its taste. They also control the water's pH at point of use which, when supplied from municipal water sources, is usually within a range of 6 to 9 pH and under EPA standards should generally be within a range of 6.5 to 8.5 pH.

Activated carbon filters at point of use comprise a well known means for removing chlorine from water. However, there are significant expenses incident to the necessary modifications to the plumbing, as well as the provision for and replacement of the filters. Moreover, a pressure drop occurs across such filters and their effectiveness for the removal of chlorines and chloramines is not always dependable.

It is also known that salts of the sulphur oxide family can be useful dehalogenation agents. Such agents include iron sulfate and thiosulfates such as sodium thiosulfate.

When adding sulfur oxides such as, for example, sodium sulfite and thiosulfates, to water, it is considered important to keep their proportions rather closely to those required for the reaction with the chlorine and chloramines therein, because greater proportions can cause a reducing effect which, although not injurious to health, is undesirable, and lesser amounts may not be sufficiently effective. When a thiosulfate is used to destroy the chlorine and chloramines resulting from hypochlorite disinfectants added to the water, these undesired substances are destroyed by an autocatalytic reaction with the thiosulfate at a molar ratio of about 0.25 moles of thiosulfate to 1 mole of hypochlorite.

Sulfite reaction times with chlorines and chloramines in tap water are reported to require minutes and sometimes hours or even days, and to be substantially dependent upon the temperature of the solutions, their pH values, and the particle sizes of the sulfites.

Sodium thiosulfate, which is the most readily available of the thiosulfates, is also known to have a cooling taste with a bitter aftertaste. It is, however, generally considered harmless and, for some purposes, beneficial in doses of a gram or less, and the same is true for calcium thiosulfate and magnesium thiosulfate. Unless otherwise qualified, the term "thiosulfate" as used herein refers to sodium thiosulfate.

SUMMARY OF THE INVENTION

I have discovered unexpectedly that the neutralization or destruction of chloramines and chlorines, when thiosulfates are added to limited quantities of tap water (generally up to about one-half gallon or two liters) in the very minute amounts (1.5 milligrams or less per quart or liter of water) as required by stoichiometric proportions, occurs very rapidly within a matter of seconds at most, and usually, in fact, in less than one second, often too quickly for accurate time measurements. The length of time for the reaction depends largely on the pH value of the water after being mixed or infused with the food or beverage material and the volume of water involved. Also, I have discovered that the dependence on the temperature for the specific applications is considerably less than anticipated and for almost all practicable purposes is nonexistent. For example, with soft drinks wherein the pH is generally in a range of 2.5 to 3.5, the destruction time is less than 0.5 seconds, and there is very little variation in this period of time irrespective of whether the liquid that is added is at a high temperature, nearly 100° C., or at a low temperature, nearly 0° C. The amount of sodium thiosulfate which is added is quite minimal being, for 8 ounces, about 0.125 milligrams. A preferred application of the thiosulfate is to the interior of a disposable container, such as a paper cup, or within the matrix of a filter as used for coffee making or as forming a tea bag.

Sodium thiosulfate used in accordance with the invention should preferably be a U.S.P. or food grade material of 99.5% purity or better. In fact, experience teaches that a very high purity 99.9% is needed to eliminate undesirable odors imparted to the material by the impurities. The amount of thiosulfate required to destroy chlorines and chloramines in most tap waters is so minimal that by using a thiosulfate of sufficiently high purity, there is no adverse or even noticeable taste imparted to the beverage or food to which the water and thiosulfate have been added. To the contrary, the thiosulfate reaction reduces the pH of the water and the resulting beverage or food, with few exceptions, tends to have its taste and flavor improved. This improvement occurs in addition to the removal of chloramines and chlorines which, per se, adversely affect the taste and flavor of the beverage or food. In those few cases wherein a decrease in the pH of the resulting beverage or food may adversely affect its flavor or taste, a buffer can be added to retard the reduction of the pH value.

The thiosulfate can be added not only to containers, and coffee filters, but also to other articles which come into contact with the water, such as tea bags and paper filters or disks for use in pitchers and carafes. Webs used for tea bags are generally soft, tissue-thin fibrous materials characterized by lightweight and freedom from rupture in boiling water. Coffee filters commercially available from Mr. Coffee, Inc. of Bedford Heights, Ohio, manufactured by the chlorine free process, have been successfully used with the invention by having thiosulfate incorporated in their matrix by injecting thiosulfate solution through as many as twelve stacked filters at once. The fibers can be any of a well known number of paper making fibers or mixtures thereof, for example, natural fibers such as manila hemp, caroa, jute, bleached or unbleached kraft, sisal and kozu or synthetic fibers, such as viscose and acetate, rayon, polyamides, vinyl acetate-vinyl chloride copolymers, wherein the addition of the small amounts of thiosulfates can be incorporated in the webs, per se, or mixed with the coffee or packaged tea. In either case, the diffusion is almost immediate although tea bags should be left for two or three minutes in boiling hot water for best results.

Coating or impregnating coffee paper filters and tea bags with thiosulfate for removal of undesirable taste, chemicals and the like, improves the coffee or tea. Moreover, the coffee filters may, as indicated above, have liquid thiosulfate solutions sprayed thereon in stacks of twelve wherein the thiosulfate, in adequate amounts, is incorporated into each filter. For tea bags, impregnation by thiosulfate in amounts of 0.1 to 0.7 milligrams per liter of water used for making the tea beverage are effective depending on the concentration of chlorine in the water to which the tea bag is to be used for brewing tea. Thiosulfate powder can, as an alternative, be mixed with the tea leaves in the tea bags at a concentration level of 0.4 to 0.6 milligrams per liter, and with instant tea at 0.2 to 0.5 milligrams per liter.

Thiosulfate in accordance with the invention can also be mixed directly with solid food material, syrups, powders or mixes of sugar, or other items which come into contact with water. This includes non-foods such as liquid and powdered soaps. It can also be used to eliminate chlorine and chloramines in drinking water, as such, at point of use. It can be mixed with artificial sweeteners, in powder form or liquid, which may be added to tea, coffee and other drinks such as cocoa to eliminate the taste of chloramines and chlorines.

As indicated above, ordinary city water generally contains up to about 3 ppm of chlorine, whereby the amounts of thiosulfate required to eliminate the chlorine from the water is quite small. It eliminates not only the taste of chlorine, but also the odor of same, and generally improves the taste of the product. Tests have shown that traces of salts and sulfates at less than 0.5 mg per liter to less than 0.05 mg per liter remain in the water so treated. This is below by an order of magnitude the E.P.A. standard minimum of 250 mg per liter or the FDA maximum of 0.1% in food products.

The invention is applicable to almost any situation wherein tap water, which has been disinfected by chlorine or chlorine containing compounds, is used.

When the pH in the water is less than 6, the chlorine is converted to hypochlorous acid (HOCl). When the pH is greater than 9, the chlorine reacts with the water to form $OCL^{-e}$, which reacts and destroys ammonia which tends to cause the taste of teas, coffees and other natural flavors to be flat.

Possible chlorine related couples which may occur in aqueous solutions include the following:

TABLE I $2Cl^- = Cl_2 + 2e^-$

TABLE I-continued $Cl^- + 2OH^- = ClO^- + H_2O + 2e^-$
$\tfrac{1}{2}Cl_2 + H_2O = HClO + H^+ + e^-$
$Cl^- + H_2O = HClO = H^+ + 2e^-$
$HClO + H_2O = HClO_2 + 2H^+ + 2e^-$
$ClO^- + 2OH^- = ClO_2 + H_2O + 2e^-$
$HClO_2 = ClO_2 + H^+ + e^-$
$ClO_2 = ClO_2 + e^-$
$ClO_2 + H_2O = ClO_3 + 2H^+ + e^-$
$ClO_2 + 2OH^- = ClO_3 + H_2O + e^-$ An important object of the invention is to convert undesirable chemical species to those which are neither harmful nor otherwise objectionable. To the extent that city water is involved, this occurs with the destruction of the chlorine and chloramines that were added to the water, usually as hypochlorite, for disinfection purposes. Inasmuch as HOCl constitutes a weak acid, it should be appreciated that the pH value plays a most important role in the thermodynamics of thiosulfate oxidation reactions. Where the pH is in excess of 9, a small amount of sodium borate ($Na_2B_4O_7.10H_2O$) may be used to reduce and control the reduction of the pH level.

When tea bags, filters, cups and the like are stored and sold in hermetically sealed containers, the amount of thiosulfate desired can be sprayed onto or into each container as appropriate, either directly or mixed with water or with a mixture of gelatin and water. Although in substantially greater amounts, various methods for applying provided materials to containers are disclosed in U.S. Pat. No. 4,312,889, of Melchelmer. In addition, for long term storage, thiosulfate particles, which preferably have a particle size of about 5–30 microns, can be encapsulated in a water soluble matrix of materials such as taught by U.S. Pat. No. 3,971,852, of Brenner et al.

Factors to be considered in how the thiosulfates are applied and whether or not they should be encapsulated or pH buffers should also be used with them, include the type of packaging for the product, that is whether or not hermetically sealed, the expected shelf life of the product, and whether the product contains any substances with which the thiosulfates may react which may preempt or substantially preclude their desired reaction with the chlorines and chloramines. Also, the specific thiosulfate used or mixture thereof may require some experimentation to determine the optimum of thiosulfate or mixture. But, as stated above, because of its ready availability, sodium thiosulfate is the preferred thiosulfate. Otherwise, only the magnesium and calcium thiosulfates are recommended for use in the invention for beverages or foods, although potassium thiosulfate should not be overlooked as a possible substitute.

When a thiosulfate is to be bonded or encapsulated, it is important that this be accomplished by a food grade material mixed with the thiosulfate.

The thiosulfate can be added to products which subsequently are mixed with water containing chlorines and chloramines, such as frozen liquid concentrates for beverages, e.g., orange juice or lemonade, in syrups for soft drinks such as Coca-Cola and Pepsi-Cola, with mixtures such as freeze dried tea and freeze dried or instant coffees, and with mixtures intended for alcoholic drinks wherein water is also added. It also can be premixed with sweeteners including artificial sweeteners, whereby the resulting product both sweetens and removes chemicals such as chlorines and chloramines simultaneously.

It has also been found that the thiosulfate can be premixed with baking products as well as other food products, which prescribe the use of added water such as cake mixes, pizza mixes, soups and soup mixes, flour, yeast and the like. Bakery products which use tap water for mixing with the flour or other mix, upon being baked, rise about 5-10% higher than without the addition of thiosulfate.

Thiosulfates can also be added to drinks, in much the same manner as small grains or pellets of sweeteners are added to liquids, including adding same to water, as such, and to premixtures for drinks which may or may not include liquids.

Thiosulfates can further be added to dispensing machines, wherein cups are automatically filled with a syrup and a carbonated water by being added to the water or to the syrup, or being preaffixed to the interior of the paper cup for receiving the beverage. It can also be added by a separate dispenser in a drop of water or as a small pellet. For drinking fountains and dispensing machines which are connected to, or which use containers filled with tap water, thiosulfate can be introduced as an additive to the water at any convenient location in the pipeline, which conveys the tap water to its point of use, by known types of metering devices such as disclosed in U.S. Pat. Nos. 3,380,467 of Diehl, Jr. et al; 3,642,171 of Ernst; 4,321,938 of Siller; and 4,369,805 of Tavor. Thiosulfate can be incorporated into yeast, dried or in cake form, wherein the yeast is used for baking products to which tap water is added in order to make the performance of the yeast more uniform, as well as to improve it and the quality of the baked product.

Although the primary object of this invention is directed to the addition of thiosulfate in small amounts to relatively small quantities of water not greater than about one-half gallon, generally one quart and preferably twenty-four ounces or less, it can also be added to bottled water or larger volumes of water, wherein there is no need for the destruction of the chlorines and chloramines to occur almost immediately or at least within a matter of a few seconds. Also, wherein substantial concentrations of hypochlorite water solutions are passed through conduits to destroy flora or fauna growing therein, the addition of thiosulfate to the solutions discharged from such conduits constitutes an environmentally acceptable treatment to neutralize the hypochlorite and resulting products, particularly for water treatment plants that have their inlets in lakes or rivers.

DESCRIPTION OF THE PREFERRED EMBODIMENTS

An important aspect of the present invention involves the discovery that thiosulfates can be added to a relatively small volume of water up to about two liters and preferably about a liter or less, which contains chlorines and chloramines within the limits generally prescribed for water from municipal water sources, whereby the chlorines and chloramines are destroyed almost immediately without adversely affecting the taste of the water. The thiosulfate in combining with the chlorines and chloramines and other substances in the water, does not add more than very minimally to the salts and other materials usually present in tap water. The tastes of beverages or foods made by the mixing of water therewith are improved to the extent that the chlorines and chloramines have been removed and also, with most foods and beverages, because the pH level of the mixture has been reduced. The discovery also encompasses the circumstance that the time lapse required to destroy the chlorines and chloramines is primarily sensitive to the pH of the water and substantially insensitive to its temperature. How the thiosulfate is added and the turbulence of the mixture may also play a part. For example, filters impregnated with thiosulfate may be used successfully with larger quantities of water. With a pH as low as 2.5, the chlorine and chloramines are destroyed essentially instantly. With a neutral pH of 7, the destruction time is approximately three seconds. When the pH is as high as 8, which is very rare for the application involved, the approximate destruction time is ten seconds and with a pH of 9, it is double that, or about twenty seconds. Finally, when the pH is as high as 10, a lapse of about thirty seconds can be expected. If it is anticipated that the pH of the water will be above 9, and the substance to be mixed with the water will not lower its pH, which is extremely unlikely not to occur, then a buffer solution may also be added to accelerate the process with the buffer solution acting to reduce the pH value to approximately 7. Thus, it will be appreciated that with a limited amount of water only (about one liter or less) when the pH value is approximately 10 or higher, the time period required for the destruction of the chlorines and chloramines in the water may be greater than one minute. But with tap water added to form a beverage or food in accordance with the invention, such a long time lapse is yet to be experienced. With thiosulfates, when the pH is at lower levels, the reaction is accelerated and becomes autocatalytic. The utility of the invention depends, of course, on the lapse of time likely to occur between when the thiosulfate is added to the water and when it is consumed. For example, for coffee or drinking apparatus using filters to which thiosulfate has been added, a minute or more may be available, wherein with a soft drink dispensing machine, the time lapse may be as short as two or three seconds. It will also be understood that the pH value of the water when it dissolves the thiosulfate, and the time lapse for the reaction to take place prior to consumption, tend to govern the amount of water than can be used and may permit the use of water in batches that significantly exceed one liter or one quart.

In an aqueous solution, a chlorine is hydrolyzed to produce an equilibrium of the ions of chlorine and hypochlorous acid. The equilibrium is such that if the pH has a value of about or somewhat greater than 3, and the chlorine is about 3 ppm, there is little or no molecular chlorine present. As the pH approaches but is under 6, whatever chlorine is in the water is readily converted to hypochlorous acid. With the pH of the water greater than 9, the chlorine reacts with water to form the negative ion $OCl^{-e}$, a species which is reactive with ammonia. Accordingly, it will be appreciated that the pH value determines the distribution of chlorine between the two species, the negative ion $OCl^{-e}$ and $HOCl$.

In water treatment plants, oxidation is used to convert undesirable chemical species to those which are neither harmful nor otherwise objectionable. However, as a practical matter, it is not possible totally to eliminate all undesired constituents from the water. Thus, chemical oxidation processes are employed primarily to reduce the concentration of inorganic chemicals containing manganese, iron, sulfides, cyanamides and sulfites, and organic substances such as phenols, amines, humic acids, and other taste, odor or color producing substances as well as toxic chemicals, bacteria and algae. The most frequently used oxidizing agents based on cost, effectiveness, ease of handling, history, and considering subsequent treatment steps, as well as the specific type of oxidation involved, are oxygen or air, ozone, hydrogen peroxide, potassium permanganate, chlorine or hypochlorites and chlorine dioxide. Depending upon the chemicals present in the water, all types of oxidation-reduction reactions may occur.

Those who direct water treatment should have a precise knowledge of the reactions, products, and conditions present. Nevertheless, a trial and error approach is often necessary. For example, water may be treated at a municipal treatment plant by the addition of lime to raise the pH and thus, cause the precipitation of calcium and magnesium with alum being added simultaneously to facilitate sedimentation. Then carbon dioxide may be added to lower the pH and powdered activated carbon added to control taste and odor. A chlorination process is often included wherein chlorine is added to raise the parts per million of the water to approximately 8 ppm with a contact time of, say, six hours. A thiosulfate may be added to eliminate residual chlorine at a stoichiometric ratio of sulfite to chlorine in amounts about three times that necessary. Remaining chlorine then may be converted to a monochloramine by the addition of ammonia at a two fold excess over the residual chlorine. This also largely suppresses mutagen production. The water is then filtered and again chlorine may be added in the form of hypochlorite to bring the chlorine content to about 3 parts per million. A typical pH may range from 7.5 to 8.5 or somewhat higher.

Because of this treatment and also to some degree, in spite of it, water received at point of use in the home or otherwise usually has about 1 to 3 parts per million chlorine content and other substances are dissolved in the water such as lime, various metals, amines, humic acids and certain levels of bacteria, algae and sulfites. The specific content of these substances varies from place to place depending upon the source of the water and the treatment accorded to the water.

Because of the variations in water sources and treatments, the various mixtures of tap water with substances to provide beverages or other foods may result in different tastes from area to area. To complicate this, populations of different areas tend to become accustomed to their water, whereby when travelling they may find beverages and foods taste quite differently from what they remember from home, as well as different from what the local inhabitants seem to experience.

Although chlorine and chloramines as well as other impurities in water can be removed, or at least substantially reduced by various filtration processes at point of use, these processes require a certain amount of time for contact with the water, space, capital costs and inconveniences incident to maintenance and replacements, as well as reducing the effective water pressure at the faucet.

I have discovered that essentially the same advantages achieved by filtration, if not greater advantages, can be obtained through the removal of chlorines and chloramines by the addition of sulfite salts and, particularly, by the addition of thiosulfates to the water immediately prior to or during preparation of the foods or foodstuffs. I have used for this purpose, primarily and preferably, sodium thiosulfate. But calcium thiosulfate and magnesium thiosulfate may also be used and, under certain conditions, potassium thiosulfate may be employed. In each case the anhydrous thiosulfate is preferred. These thiosulfates may be applied individually or in combination. Preferably the thiosulfate should be at least 99.9% pure or better to eliminate undesirable odors that may be caused by the impurities.

The thiosulfate may be bonded directly or by the use of food grade bonding material, to paper and other disposable cups and drinking containers. A sixteen ounce container requires not more than 0.75 to 1.0 milligrams per liter of thiosulfate bonded to the interior of the cup. The temperature at which the tap water is added to the container, it has been found, has very little effect on the rapidity of the reaction of the thiosulfate with the chlorines and chloramines in the water. The length of time required for reaction is determined almost entirely by the pH of the mixture and, as a practical material, is essentially immediate. Inasmuch as the water is usually being added to a powder or syrup mix, or being added simultaneously therewith, and because most beverages have a pH value of less than 7, the destruction of the chlorines and chloramines in the beverage occurs in less than three seconds. There is also is a significant reduction or destruction of organic substances such as amines, humic acids, bacteria, algae and metals ions dissolved in the water. The beverage tastes, such as the tastes of tea and, in most cases, coffee, are substantially improved compared to the same beverages without the thiosulfate having been added. Although sodium thiosulfate is known to provide a cooling taste with a bitter aftertaste, the amount added is so minute that the taste of the thiosulfate, as such, is not detectable.

Most beverages have relatively low pH values. Accordingly, thiosulfate can be added by a dispensing machine for a soft drink either diluted in water, applied to the container as described above or mixed in the soft drink syrup or powder. Because the reaction time is less than three seconds, and usually is essentially immediate, by the time the person using the dispensing machine commences to drink the beverage, the reaction is substantially complete whereby the individual appreciates the improved taste due to the elimination of chlorines and chloramines from the beverage.

If the thiosulfate is added to a hot beverage such as coffee, it can be mixed with the coffee material, per se, applied to the container for receiving the coffee in either dry or liquid form or applied to a coffee filter. In practice, it has been found that thiosulfate in solution form can be injected into stacks of twelve coffee filters with each filter receiving and incorporating a sufficient amount of thiosulfate into its matrix for subsequent effective neutralization of the chlorines and chloramines in the water during the coffee making process and significantly to improve its flavor. Tests were conducted utilizing Mr. Coffee ® coffee filters which had been treated as set forth above with thiosulfate to determine if the filter reduced chlorine in the drinking water without adding additional substances to the water. The tests were conducted in accordance with NSF standards 42 and 53. A Mr. Coffee model SR-10 coffee maker and treated filters in accordance with the invention were used for the evaluation. The filters were composed of filter paper formed in the shape of cups having circular bottoms of about nine centimeters in diameter and serrated diverging sides about 5.5 centimeters in length to form the open top portion having a diameter of about thirteen centimeters, the filter being filled with coffee and used in the normal manner in the coffee maker. Each filter had sodium thiosulfate applied thereto in the bottom portion in amounts which ranged from 0.5 to 0.8 milligrams and at an average of 0.65 milligrams. The filters were produced by a chlorine-free process, thus eliminating therefrom chlorine and chloramines. Five one-liter aliquots of tap water were poured through the coffee maker prior to testing to ensure that residual particulate matter which may have accumulated in the coffee maker during shelf storage did not influence the results of the test. Testing consisted of pouring 1,150 milliliters of tap water through the coffee maker during the brew cycle and collecting the effluent in a glass carafe. The influent tap water temperature was 24° C. and the effluent temperature was 83° C. Immediately following the brew cycle, the effluent was poured into the appropriate glass containers for analysis. After cooling to 40° C., the remainder of the effluent sample was poured into the appropriate plastic container. The containers, appropriate preservatives, and analysis performed are detailed in Table II. In addition, the tap water sample was analyzed for turbidity, alkalinity and total residual chlorine.

TABLE II

CONTAINERS AND PRESERVATION OF SAMPLES FOR MR. COFFEE FILTER TESTING

| CONTAINER | ANALYSIS | METHOD | PRESERVATIVE |
|---|---|---|---|
| 500 mL Glass | Total Organic Carbon | EPA 415.1 | NONE |
|  | Total Dissolved Solids | EPA 160.1 | cool to 4° C. |
|  | Nitrate | EPA 353.1 |  |
|  | Sulfate | EPA 375.4 |  |
| 40 mL VOA vial | Total Residual Chlorine | EPA 330.5 | no head space |
|  |  | Hach Kit DR 100 |  |
| 250 mL Plastic | Calcium | EPA 200.7 | $HNO_3$ to pH < 2 |
|  | Iron | EPA 200.7 | cool to 4° C. |
|  | Magnesium | EPA 200.7 |  |
|  | Potassium | EPA 200.7 |  |
|  | Sodium | EPA 200.7 |  |
| 125 mL Glass | Total Phosphorus | EPA 365.4 | $H_2SO_4$ to pH < 2 |
|  | Ortho phosphate | EPA 365.1 | cool to 4° C. |
| 250 mL Glass | pH | EPA 150.1 | cool to 4° C. |
|  | Turbidity | Hach Model 2100A |  |
|  | Alkalinity | SM 2320 |  |

EPA - Environmental Protection Agency
SM - Standards for the Examination of Water and Wastewater, 17th Ed., 1989

Each test consisted of four runs. One was a control run of the assembled coffee maker without a filter. The other three runs utilize the same assembly with the treated filter for each. The results of the first test are summarized in Table III below with the exception of residual chlorine, the concentrations of compounds did not differ appreciably between the control sample and the test with the filters. For total residual chlorine, a decrease in concentration as well as of using the filter is evident. The coffee maker alone reduced chlorine concentration by 61%. The treated filter reduced the chlorine concentration by an additional 63%, resulting in an overall reduction of 86%.

TABLE III

RESULTS FROM MR. COFFEE FILTER TESTING

| ANALYSIS | CONCENTRATION (mg/L) - except as noted ||||
| | TAP WATER | NO FILTER | FILTER NO. 1 | FILTER NO. 2 | FILTER NO. 3 |
|---|---|---|---|---|---|
| Chlorides | — | 6 | 6 | 6 | 6 |
| Total Residual Chlorine | 0.9 | 0.35 | 0.17 | 0.11 | 0.11 |
| Nitrate Nitrogen | — | 0.34 | 0.36 | 0.38 | 0.42 |
| Sulfates | — | 6 | 5 | 5 | 6 |
| Ortho-phosphate | — | <0.05 | <0.05 | <0.05 | <0.05 |
| Total | — | <0.05 | <0.05 | <0.05 | <0.05 |

TABLE III-continued

RESULTS FROM MR. COFFEE FILTER TESTING

| ANALYSIS | CONCENTRATION (mg/L) - except as noted ||||
| | TAP WATER | NO FILTER | FILTER NO. 1 | FILTER NO. 2 | FILTER NO. 3 |
|---|---|---|---|---|---|
| Phosphorus |  |  |  |  |  |
| Total Organic Carbon | — | 2.16 | 2.66 | 2.44 | 3.51 |
| Total Dissolved Solids | — | 59 | 60 | 60 | 63 |
| Alkalinity (as $CaCO_3$) | 22.8 | 24.7 | 23.9 | 24.4 | 23.6 |
| Calcium | — | 9.99 | 9.66 | 9.68 | 8.65 |
| Iron | — | 0.042 | 0.034 | 0.033 | <0.03 |
| Magnesium | — | 1.14 | 1.14 | 1.12 | 0.97 |
| Potassium | — | 1.42 | 1.4 | 1.44 | 1.26 |
| Sodium | — | 4.72 | 4.65 | 4.13 | 4.12 |
| pH | 8.86 | 7.3 | 7.2 | 7.42 | 7.25 |
| Turbidity | .23 NTU | .3 NTU | .26 NTU | .3 NTU | .28 NTU |

Table IV presents results of a testing for total residual chlorine. The coffee maker alone reduced chlorine concentration by 71%. The filter reduced the chlorine concentration by an additional 83% resulting in an overall reduction of 95%.

TABLE IV

RESULTS FROM MR. COFFEE FILTER TESTING FOR TOTAL RESIDUAL CHLORINE

| SAMPLE | TOTAL RESIDUAL CHLORINE (mg/L) |||
| | TAP WATER | NO FILTER | WITH FILTER |
|---|---|---|---|
| 1 | 1.0 | 0.27 | 0.06 |
| 2 | 1.0 | 0.29 | 0.04 |
| 3 | 1.0 | 0.30 | 0.04 |
| AVERAGE | 1.0 | 0.2883 | 0.0467 |
| STANDARD DEVIATION | 0 | 0.01258 | 0.01153 |

It can be concluded that pouring tap water through the Mr. Coffee coffee maker without a filter significantly reduced chlorine concentration. The addition of the treated filter resulted in an additional reduction. The reduction in free residual chlorine in tap water was accomplished without affecting the concentration of the other water constituents that were analyzed in the study.

The amount of thiosulfate which is to be added to the water can, if desired, be customized to the water of the local area. Thus, for example, wherein the chlorine levels are less than the usual maximum of 2.5 or 3 ppm, lesser amounts of thiosulfate may be used. However, even if more thiosulfate is added than required to neutralize or destroy the chlorine, which is 0.25 to 1 on a molecular basis to the stoichiometric amount of chlorine and chloramines present in the water, the thiosulfate is harmless in any event, being well below the maximums prescribed by the FDA and EPA.

Tea, containing tannic acid, generally has a naturally low pH (3 to 7, but usually nearer to 3 than 7) which causes thiosulfate to combine almost immediately (three seconds or less) with chlorines when it is added to hot tap water containing chlorine and therefore thiosulfate is advantageously impregnated in tea bags, blended with tea leaves to be used for making teas, or mixed with instant tea. Thiosulfate is impregnated in tea bags at a capacity of 0.1 to 0.7 milligrams per liter based upon the amount of water to be used with the tea bag in producing the tea beverage. It is blended with tea leaves at a concentration level of 0.4 to 0.5 milligrams per liter, and mixed with instant tea at 0.2 to 0.5 milligrams per liter.

The thiosulfate can be dispensed in pellets, liquid drops or bonded or otherwise affixed to the filter or the container or other material which filters or containers or other materials will contain the mix or the beverage, or both. It also may be encapsulated in substances which are harmless, as such, to humans and which dissolve readily in water. This is important when a long shelf life is desired or when adding the thiosulfate directly to the mix to prevent unwanted reactions between the thiosulfate, per se, and the substances of the mix before use. Many items such as filters for coffee and the cups in a dispensing machine need not have long shelf lives and any requirement to protect by encapsulation or covering the thiosulfate bonded in such filters and cups is not, in most areas, a problem if normal packaging procedures are followed. On the other hand, wherein long shelf life is desired, it is important that the encapsulation or covering substances not only be readily dissolvable in water but also capable of being so dissolved in a manner of a second or so, to permit rapid dispersion and diffusion of the thiosulfate into the surrounding liquid.

In addition to applying thiosulfates to containers, powdered mixes and syrups or concentrates, it also can be applied to articles which are used to stir or otherwise are placed in liquids wherein the thiosulfate reaction with the chlorine and chloramines is desired. Examples are plastic or wooden spoons used for stirring, stirrers, as such, and straws which are inserted into liquids. With straws, minor amounts of thiosulfate may be applied both to their inner and outer surfaces or to either. A process for applying thiosulfate to such articles will be understood by reference to U.S. Pat. No. 3,252,803, of Belasco which, although it does not relate directly to thiosulfates, discloses how edible solvents can be adhesively applied to spoons and spatulas as well as cups.

Treatment of tap water in accordance with the invention results in a small amount of added salt, NaCl and sodium sulfates where sodium thiosulfate is used or corresponding salts with the other thiosulfates. However, the additional salts are so minimal as to be insignificant for those who avoid salt for dietary reasons.

Although I have described the preferred embodiments of my invention, it is understood that it is capable of other adaptations and modifications within the scope of the appended claims.

Having disclosed my invention, what I claim is new and to be secured by Letters Patent in the United States is:

1. A process for removing chlorines from a coffee beverage in a coffee making process comprising the step of introducing water which is used for making said beverage at a temperature and in an amount sufficient to brew the coffee beverage, said water having a chlorine content of 1-3 ppm and a pH of 6 to 9, into a basket of a coffee maker that holds a filter and coffee grounds in said filter, said filter having added to it a material consisting of an alkali metal or alkaline earth metal thiosulfate selected from the group consisting of sodium thiosulfate, magnesium thiosulfate and calcium thiosulfate, in a quantity that reacts with 60% to 100% the chlorines in said water on a 0.25-1.00 to one molecular basis with the stoichiometric amount of chlorine present in said water that is so reacted with, said reaction being substantially complete in less than about twenty seconds from when said alkali metal or said alkaline earth metal thiosulfate in said filter was exposed to and dissolved by said water, said water contacting said coffee grounds in said filter for a sufficient time and at a sufficient temperature to make said coffee beverage.

2. A process in accordance with claim 1, wherein said material is 99.9% pure sodium thiosulfate.

3. A process in accordance with claim 2, wherein said filter comprises a fibrous matrix and said sodium thiosulfate has first been impregnated in the fibrous matrix of said filter that filters the coffee beverage in said coffee making process.

4. A process in accordance with claim 3, wherein said sodium thiosulfate is added to said coffee beverage by being desorbed from said fibrous matrix of said filter.

5. A process in accordance with claim 3, wherein the amount of said sodium thiosulfate that has been applied to said filter is between about 0.2 and 0.9 milligrams.

6. A process for removing chlorines from a tea beverage in the tea making process comprising the step of introducing water which is used for making said beverage at a temperature and in amount sufficient to make the tea beverage, said water having a chlorine content in the range of about one to three parts per million and a pH in the range of about 6 to 9, into a container and inserting therein a tea bag containing tea leaves that have been prepared for brewing, said tea bag having added to it a material consisting of an alkali metal or alkaline earth metal thiosulfate selected from the group consisting of sodium thiosulfate, magnesium thiosulfate and calcium thiosulfate, in a quantity that reacts the chlorines in said water on a 0.25-1.00 to one molecular basis with the stoichiometric amount of chlorine present in said water, said reaction be substantially complete in less than about three seconds from when said alkali metal or said alkaline earth metal thiosulfate in said tea bag was exposed to and dissolved by said water, said water steeping said tea leaves in said bag for a sufficient time and at a sufficient temperature to make said tea beverage.

7. A process in accordance with claim 6, wherein said material is 99.9% pure sodium thiosulfate.

8. A process in accordance with claim 7, wherein said tea bag comprises a fibrous matrix and sodium thiosulfate has first been impregnated into the fibrous matrix of said tea bag in a range of 0.1 to 0.7 milligrams per liter based on that quantity of water that is introduced for making said tea beverage in said container with said tea bag therein.

9. A process in accordance with claim 8, wherein said sodium thiosulfate is introduced into said tea beverage by being desorbed from the fibrous matrix of said tea bag at the same time that tea from tea leaves within said tea bag is being infused into the water to produce said tea beverage.

10. A process for removing chlorines from a tea beverage in the tea making process comprising introducing a tea beverage making substance into water which is used for making said tea beverage at a temperature and in an amount sufficient to make said tea beverage by the dissolution of said substance, said water having a chlorine content of about one to three parts per million and a pH of about 6 to 9 wherein the tea beverage substance is selected from a group consisting of instant tea and tea leaves, said tea beverage substance having added to it a material consisting of an alkali metal or an alkaline earth metal thiosulfate selected from the group consisting of sodium thiosulfate, magnesium thiosulfate and calcium thiosulfate, in a quantity of 0.2 to 0.6 milligrams per liter of that amount of said water which is sued in the process, said thiosulfate's reaction with said chlorines in said water being substantially complete in less than about three seconds from when said thiosulfate was exposed to and dissolved by said water, said water contacting said substance at a sufficient temperature and within a sufficient period of time to make said tea beverage.

11. A process in accordance with claim 10, wherein said material is 99.9% pure sodium thiosulfate.

12. A process in accordance with claim 11, wherein said tea beverage making substance consists essentially of tea leaves said thiosulfate having been first blended into said tea leaves in a range of 0.4 to 0.6 milligrams per liter of the amount of water used for making said tea beverage.

13. A process in accordance with claim 11, wherein said tea beverage making substance consists essentially of instant tea and said sodium thiosulfate has been first mixed therewith in a range of 0.2 to 0.5 milligrams per liter of the amount of water used for making said tea beverage.

* * * * *